United States Patent [19]

Hagenbach et al.

[11] 4,242,143

[45] Dec. 30, 1980

[54] PROCESS FOR IMPROVING THE PROPERTIES OF BITUMINOUS PRODUCTS AND AN IMPROVED CAST ASPHALT

[75] Inventors: Germain Hagenbach, Vernaison; Paul Maldonado, St Symphorien D'Ozon, both of France

[73] Assignee: Elf Union, Paris, France

[21] Appl. No.: 948,545

[22] Filed: Oct. 4, 1978

[30] Foreign Application Priority Data

Oct. 5, 1977 [FR] France .................. 77 29953

[51] Int. Cl.³ .................. C08L 91/06; C08L 95/00
[52] U.S. Cl. .................. 106/272; 106/279; 106/280; 106/DIG. 7
[58] Field of Search .............. 106/279, 272, 270, 280, 106/DIG. 7; 260/28.5 AS

[56] References Cited

U.S. PATENT DOCUMENTS

| | | | |
|---|---|---|---|
| 3,291,767 | 12/1966 | Zaayenga | 106/279 |
| 3,634,293 | 1/1972 | Bonitz | 106/279 |

FOREIGN PATENT DOCUMENTS 1417572  12/1975  United Kingdom .

*Primary Examiner*—Theodore E. Pertilla
*Attorney, Agent, or Firm*—Burgess, Ryan and Wayne

[57] ABSTRACT

A process for improving the properties of a bitumen which comprises mixing the bitumen with from about 5 to 20% by weight based on the bitumen, of a polyolefin wax at an elevated temperature for a period of time necessary to form a homogeneous mixture. The modified bitumen is particularly useful as a binder in asphalt to be used for casting.

8 Claims, No Drawings

PROCESS FOR IMPROVING THE PROPERTIES OF BITUMINOUS PRODUCTS AND AN IMPROVED CAST ASPHALT

The present invention is directed to a process for improving the properties of bituminous products, especially their plasticity, and resistance to creeping and shrinking without impairing their viscosity, and changing the usual conditions of their use for coatings, coverings and binders.

BRIEF DESCRIPTION OF THE INVENTION

The process of the invention comprises introducing into the bitumen, which may be a road type or an oxidized bitumen, a polyolefin wax, in an amount sufficient to provide a modified bitumen with the required properties, and stirring the mixture for at least 1 hour at a temperature of from about 130° to 260° C. Polyethylene wax is particularly useful in the process.

DETAILED DESCRIPTION OF THE INVENTION

The bitumens that are useful in practice of the invention have a penetrability of from about 300 to 10 according to the standard (NFT 66 004).

The bitumens can be:
residues from atmospheric or under vacuum distillation of crude petroleum;
residues from solvent extraction of petroleum fractions, i.e., propane, butane, pentane, and the like;
residues from extraction of thermal or catalytic cracked petroleum fractions;
bitumens prepared by air blowing a heavy petroleum fraction having a boiling point above about 200° C.

Polyolefin waxes are produced during the manufacture of polyolefins and comprise oligomers of relatively low molecular weight. Polyethylene waxes are particularly useful in the present invention.

The polyethylene waxes useful in the practice of the present invention are by-products of the manufacture of low-density polyethylene. Polyethylene waxes are generally polyethylenes of a relatively low molecular weight. At room temperature, they are in the form of a wax whose viscosity decreases with increases in temperature.

The characteristics of one type of a suitable polyethylene wax are shown in Table I.

TABLE I

| | | |
|---|---|---|
| Penetrability (250° C., 100 g, 5 secs., 1/10 mm NF T 66004) | | 30 |
| Viscosity: ASTM D 2170 | 130° C. | 196 cSt |
| | 160° C. | 103 cSt |
| | 180° C. | 70 cSt |

TABLE I-continued

| | |
|---|---|
| Density at 20° C.: NF T 66007 | 0.912 g/ml |

Polyethylene waxes are miscible with road-type bitumens and with oxidized bitumens.

The wax-bitumen mixtures are homogeneous up to certain concentrations of wax. The maximum concentration of wax which can form a homogeneous mixture with a bitumen depends on the specific characteristics of the wax and on the nature of the bitumens which are to be mixed.

By way of a non-limiting example, the wax described in Table I is soluble up to about 12% by weight in a bitumen having a 40/50 penetrability obtained by vacuum distillation of the crude "Arabe Lourd". However, it is possible to mix with the 40/50 bitumen, amounts of wax exceeding 12% by weight. When more than 12% of the wax described in Table I is mixed with the 40/50 bitumen, a two phase mixture is obtained wherein a portion of the wax floats on the surface of the bitumen at the mixing temperature.

The wax used in Examples 1 to 4 is the one described in Table I. Different mixtures were made containing 5, 10, 15 and 20% wax in bitumen of a 40/50 penetrability. The mixtures were obtained by stirring the polyethylene wax and bitumen for 1 hour at 170° C. The results are shown in Table II which sets forth the characteristics of the mixtures.

TABLE II

| Example | Wax content (% by weight) | Penetration 25° C. NFT 66004 | Fraass point IP 80.53 | Softening point B and A NFT 66008 | ASTM D 2170 Viscosities cST | | |
|---|---|---|---|---|---|---|---|
| | | | | | 130° C. | 160° C. | 180° C. |
| 1 | 5% | 40 | −15 | 55 | 866 | 210 | 102 |
| 2 | 10% | 40.5 | −20 | 62 | 870 | 195 | 96 |
| 3 | 15%* | 46 | −14 | 78 | 416 | 98 | 35 |
| 4 | 20%* | 60 | — | 85 | 230 | 105 | 57 |
| 5 | 40/50 bitumen (0% wax) | 50 | −12 | 52 | 1500 | 230 | 110 |

*non-homogeneous mixtures outside the scope of the present invention.

At concentrations of less than 12% by weight, in the 40/50 bitumen, polyethylene waxes produce an increase of the plasticity range of the bitumen (the range between the TBA softening point and the Fraass brittleness point) by increasing the Bille and Anneau softening point and decreasing Fraass brittleness point.

The fluidizing effect of the polyethylene wax on the bitumen is evident at temperatures around 130° C. At temperatures above 150° C., the mixtures of bitumens and polyethylene waxes show substantially the same viscosity as the bitumen.

The bitumens modified by polyethylene wax can be advantageously used in the manufacture of cast asphalt.

Cast asphalt is a mixture of sand, fine gravel, fillers and bitumen in proportions such that the product can be cast while hot without compacting. In certain formulae, part of the bitumen and the fillers can be replaced by ground natural asphalt containing rock.

Cast asphalt can be used in making:
impervious covers such as roofs, terraces, parking lots, linings, works of art;
coatings for areas such as sidewalks, sport areas, urban public ways, floating coatings, and country highways and expressways.

The ideal binder for cast asphalt is one having:

good flexibility at low service temperatures and strong consistency at high service temperatures; and a low viscosity (not higher than that of the bitumen) at application temperatures.

The bitumens modified by polyolefin waxes and particularly polyethylene waxes produce a binder with the characteristics required for preparation of cast asphalt as can be seen in Examples 5 to 9, which are not limiting.

EXAMPLES 5 TO 9

Casting asphalt was prepared according to the following formula:
fine gravel 2/4: 23%
sand 0/5: 43.5%
calcareous filler: 25%
bitumen 60/70: 8.5%

The 60/70 bitumen in the formula was substituted by the polyethylene wax bitumen mixture of the present invention and the properties of the casting asphalt was measured. The bitumen polyethylene wax mixture was prepared according to the method used in Examples 1–4.

The binder content of the formula was adjusted at 8.6% taking into account the density of the wax.

The cast asphalt was prepared by mixing the materials in a mixer at a temperatue of from 250° to 260° C.

The cast asphalt was tested for workability and indentation. The results of the tests are shown in Table III.

The 2/4 fine gravel is gravel that passes through an AFNOR screen with mesh having dimensions from 2 to 4 mm.

The 0/5 sand is sand that passes through a screen with a mesh smaller than 5 mm.

The calcareous filler is a calcareous material with particles smaller than 80 microns.

TABLE III

| Examples | Composition | Workability | Indentation |
|---|---|---|---|
|  | Reference asphalt 8.5 bitumen 60/70 | 23 | 12 |
| 5 | Asphalt with a binder of 6% wax | 19 | 9 |
| 6 | Asphalt with a binder of 8% wax | 26 | 7 |
| 7 | Asphalt with a binder of 10% wax | 37 | 5 |
| 8 | Asphalt with a binder of 12% wax | 42 | 6 |

TABLE III-continued

| Examples | Composition | Workability | Indentation |
|---|---|---|---|
| 9 | Asphalt with a binder of 14% wax | 50 | 4 |

For good workability, the wax content of the 60/70 bitumen should not exceed 8 to 9%.

The addition of wax of the bitumen results in a lowering of the indentation value. This lower indentation value does not produce a harmful shrinkage phenomena as long as the wax content of the bitumen does not exceed 9%.

It can be seen, that the asphalt formula using a 60/70 bitumen, the substitution for pure bitumen of the same bitumen containing from 6 to 9% polyethylene wax results in a material clearly more resistant to creeping having lower indentation values which is easy to handle and is not subject to harmful shrinkage.

The asphalt prepared using the polyolefin wax containing bitumen of the present invention is particularly useful for building parking lots where the marking of the asphalt resulting from the wheels of parked vehicles is a problem.

We claim:

1. In a cast asphalt composition comprising sand, gravel, fillers and bitumens in proportions such that the product can be cast while hot without compacting, the improvement which comprises using as said bitumen a mixture comprising a bitumen having a penetrability of from about 10 to 300 and a soluble amount of from about 5 to 20% by weight based on the weight of the bitumen of a polyolefin wax.

2. The cast asphalt composition of claim 1 wherein the mixture is prepared by mixing the bitumen and polyolefin wax for at least one hour at a temperature between 130° and 260°.

3. The cast asphalt composition of claim 2 wherein the mixing is carried out at about 170° C.

4. The cast asphalt composition of claim 1 wherein the polyolefin wax is a by-product of the manufacture of low density polyethylene.

5. The cast asphalt composition of claim 1 wherein the bitumen which is mixed with the polyolefin wax is a road type bitumen or an oxidized bitumen.

6. The cast asphalt composition of claim 1 wherein the wax is a polyethylene wax.

7. A cast asphalt composition of claim 1 wherein the asphalt contains from about 8 to 9% of the bitumen containing from about 6 to 14% polyolefin wax.

8. The cast asphalt composition of claim 7 wherein the polyolefin wax is a polyethylene wax.

* * * * *